United States Patent [19]

Mehrens et al.

[11] 4,353,846

[45] Oct. 12, 1982

[54] FILTER ASSEMBLY FOR EVAPORATIVE COOLER PUMPS

[76] Inventors: Douglas W. Mehrens, 918 W. Portland, Phoenix, Ariz. 85004; James F. Kuchar, 5524 E. Cactus, Scottsdale, Ariz. 85254

[21] Appl. No.: 321,766

[22] Filed: Nov. 16, 1981

[51] Int. Cl.³ .............................................. B01D 35/02
[52] U.S. Cl. ................................................ 261/4; 261/5; 261/29; 210/232; 210/416.1; 415/121 G
[58] Field of Search .......................... 261/4, 5, 6, 29; 415/121 G; 416/247 R; 210/416.1, 232, 233

[56] References Cited

U.S. PATENT DOCUMENTS

| | | | |
|---|---|---|---|
| 2,562,445 | 7/1951 | Butler et al. | 210/233 |
| 2,747,513 | 5/1956 | Atkinson | 415/121 G |
| 3,046,900 | 7/1962 | Pollak | 415/121 G |
| 3,333,834 | 8/1967 | Brewster | 415/121 G |
| 3,802,806 | 4/1974 | Blum | 415/121 G |
| 3,904,393 | 9/1975 | Morse | 261/4 |
| 4,202,771 | 5/1980 | Hoff | 210/232 |
| 4,312,819 | 1/1982 | Leyland | 261/29 |

Primary Examiner—Tim R. Miles
Attorney, Agent, or Firm—Warren F. B. Lindsley

[57] ABSTRACT

An improved water filter assembly for use with an evaporative cooler pump, the filter comprising a cylindrical filter wall, a closed base and a neoprene curtain that covers the top but opens to receive the pump impeller.

6 Claims, 7 Drawing Figures

U.S. Patent  Oct. 12, 1982  4,353,846
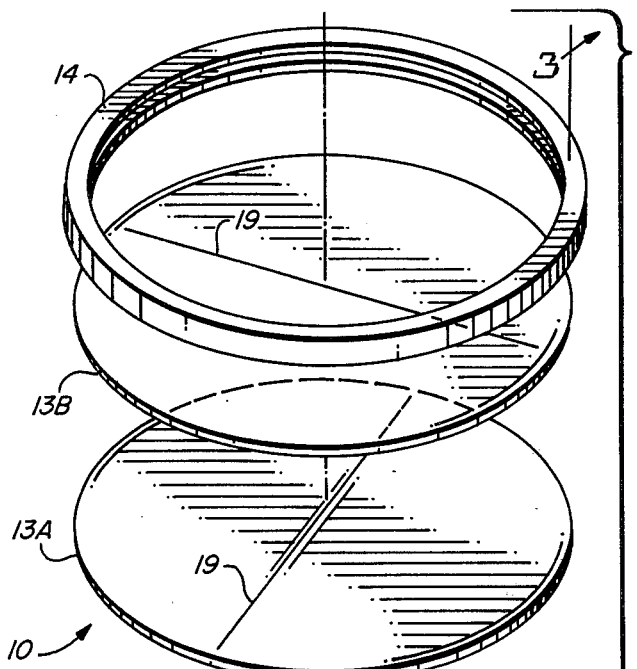
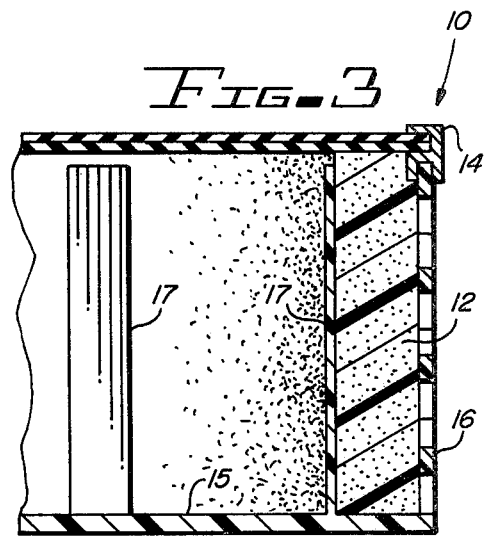
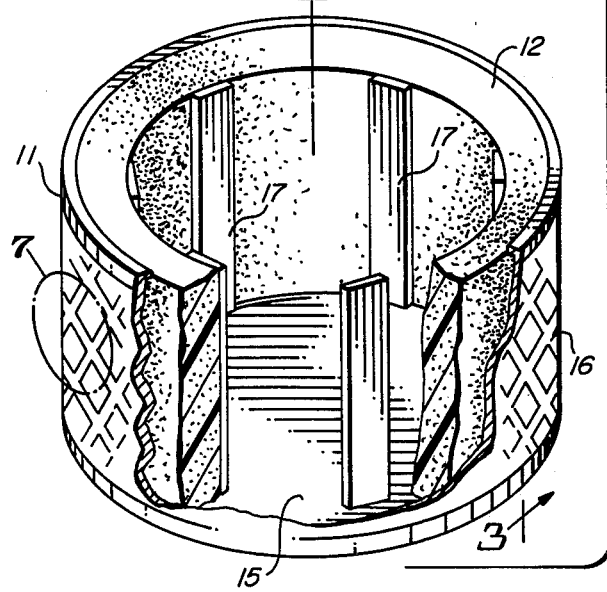
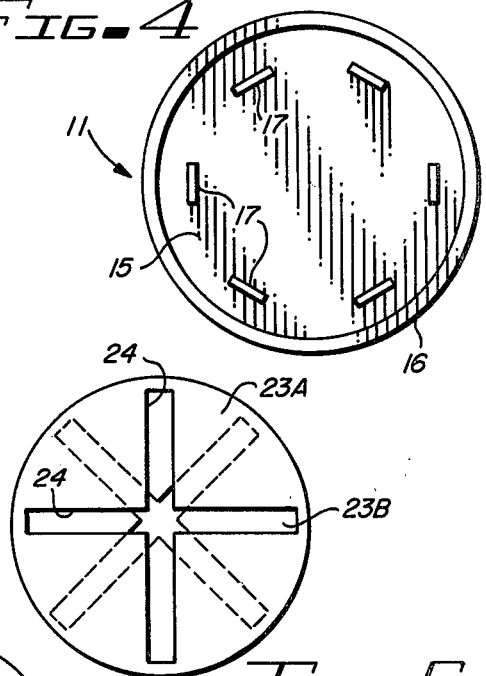
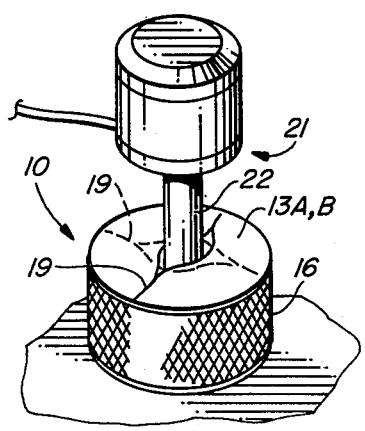
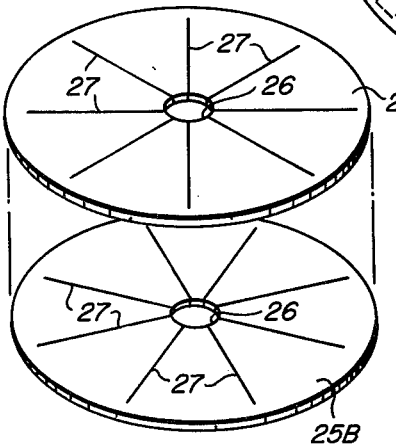
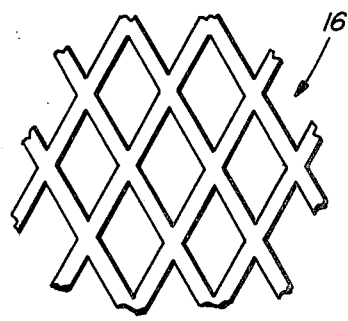

FILTER ASSEMBLY FOR EVAPORATIVE COOLER PUMPS

BACKGROUND OF THE INVENTION

With the advent of higher energy costs, the evaporative cooler as an air conditioning system is again assuming prominence in the marketplace. Its installation and operating costs are more economical than a refrigeration unit and even where a refrigeration system is needed, the trend is to utilize both types of cooling systems working together to provide an effective and efficient air conditioning system. Improvements to existing forms of evaporative coolers have thus assumed renewed importance.

One problem associated with evaporative coolers is that the water-circulating pump is typically not provided with a filter. As a result, the pump tends to become clogged with dirt and debris. Because of the constant influx of dust-laden air into the cooler and the breaking away of cooler pad materials, this problem can be especially pronounced.

DESCRIPTION OF THE PRIOR ART

At the present time most evaporative coolers are not provided with water filters. In some cases, a very crude basket type filter is employed, the circulating pump being positioned inside the open basket. Because the basket filter is open at the top, dirt and dust tends to fall into the basket and is then drawn into the pump. In a relatively short time the pump may become clogged or damaged.

SUMMARY OF THE INVENTION

In accordance with the invention claimed, a new and improved water filter is provided specifically for use in evaporative coolers. The improved filter provides more effective protection against contamination and early pump failures.

It is, therefore, one object of this invention to provide an improved water filter for an evaporative cooler pump.

Another object of this invention is to provide such a filter in a form that may be readily employed with commercially available evaporative cooler pumps.

A further object of this invention is to provide an evaporative cooler pump in the common basket form but with a convenient means for covering the top of the basket.

A still further object of this invention is to provide such a filter with a top covering that may be easily parted during the entry and exit of the pump impeller structure.

A still further object of this invention is to provide such a filter in a form that permits the removal and replacement of the filter material.

Yet another object of this invention is to provide such a filter in an inexpensive form so that it will be economically feasible to discard the filter as it becomes contaminated and replace it with a new filter.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described with reference to the accompanying draing, in which:

FIG. 1 is an exploded perspective view of a filter assembly with a portion of the assembly broken away to expose details of its interior construction;

FIG. 2 is a perspective view of a typical evaporative cooler pump installed for operation in the improved filter of the invention;

FIG. 3 is a partial cross-sectional view of the filter assembly as viewed along line 3—3 of FIG. 1;

FIG. 4 is a top view of the base of the filter assembly with the filter cell and top covering removed;

FIG. 5 is a plan view of a modified top covering for the filter assembly;

FIG. 6 is an exploded perspective view of another variation of the top covering; and FIG. 7 is an enlarged view of the outside covering of the filter assembly as viewed in the circled area 7 of FIG. 1.

DESCRIPTION OF THE PREFERRED EMBODIMENT

Referring more particularly to the drawing by characters of reference, FIGS. 1-7 disclose an improved water filter assembly 10 comprising a housing 11, a removable filter pad 12, two top cover discs 13A and 13B and a retainer ring 14.

Housing 11 comprises a one-piece molded plastic part with a circular or disc-shaped base plate 15, a vertical cylindrical outer wall 16, and a number of inner support posts 17 each secured at one end to base plate 15 and extending laterally therefrom toward ring 14. The outer wall 16 rises from the periphery of base plate 15 in a substantially vertical arrangement. As shown in FIG. 4, the support posts 17 are uniformly spaced about a centered circle somewhat smaller in diameter than the diameter of base plate 15. The separation between posts 17 and wall 16 corresponds to the thickness of filter pad 12. The heights of wall 16 and posts 17 correspond to the height of pad 12. Posts 17 are thin and flat with their width dimensions lying along the circle about which they are spaced.

As shown in FIG. 7, wall 16 may be formed from an open mesh or perforated sheet that will not only provide support for filter pad 12 and for top cover discs 13A and 13B but will at the same time provide passages or openings for the movement of water therethrough.

Cover discs 13A and 13B are flexible circular pads, formed preferably from neoprene with each disc having a slit 19 that lies along a diameter of the disc and extends almost to the circumference at each end.

The retainer ring 14 generally in circular form is made from metal or molded plastic. As shown in FIG. 3, it is formed to provide a pair of juxtapositioned fingers or grooves facing downwardly when positioned as shown in FIG. 3 to receive between the grooves the top edge of wall 16. A second pair of fingers or grooves are arranged to face radially inward of its periphery to receive the outer edges of discs 13A and 13B.

Filter pad 12 is shown as a cylindrical shell of reticulated foam or other suitable material. Alternatively it may be provided in the form of a flat rectangular sheet that is formed into a cylindrical shell as it is installed in housing 11.

To assemble the filter assembly 10, filter pad 12 is first formed and installed between support posts 17 and wall 16 of housing 11. Discs 13A and 13B are then mounted in the retainer ring 14 with their outer edges inserted or clamped in the radially inward facing groove of ring 14. In the mounting of discs 13A and 13B, the relative orientation of the discs is preferably controlled to assure that slit 19 of disc 13A is at a right angle to slit 19 of disc 13B. Finally, ring 14 with mounted discs 13A and 13B positioned therein is mounted atop housing 11 with the downwardly facing groove of ring 14 receiving therebetween the top edge of wall 16. The fit of ring 14 over wall 16 is snug so that the entire assembly 10 is securely held together.

As shown in FIG. 2, the evaporative cooler pump 21 is installed for operation with filter assembly 10 by inserting the impeller structure and shaft housing 22 through slits 19 of discs 13A and 13B. Slits 19 are separated or pulled open as the impeller structure is slipped between. As the neoprene discs relax to assume their natural form, slits 19 tend to close snugly against shaft housing 22 to form a substantially total closure or covering around shaft housing 22 and over the top of the filter assembly 10.

As pump 21 is operated, water is drawn through wall 16 and pad 12 into the impeller housing of the pump. Pad 12 removes substantially all foreign matter from the water preventing contamination of the pump.

FIG. 5 shows a variation of the covering discs 13A and 13B of FIG. 1. Discs 23A and 23B of FIG. 5 are again formed from a suitable flexible material such as neoprene. In place of the single slit 19, however, discs 23A and 23B are each provided with two mutually perpendicular open slots 24. Each slot 24 lies along a diameter of the disc and extends almost to the periphery or circumference of the disc. As shown in FIG. 5, the relative orientation of discs 23A and 23B is such that slots 24 of discs 23A are not aligned with slots 24 of disc 23B but are preferably displaced from each other by an angle of forty-five degrees.

Discs 25A and 25B of FIG. 6 constitute another variation of discs 13A and 13B. In this case, each of discs 25A and 25B has a small circular opening 26 at the center corresponding to the outside diameter of shaft housing 22. Extending radially outward from opening 26 are a number of equally spaced slits 27. Slits 27 extend almost to the circumference of disc 25A or 25B. Again the orientation of discs 25A and 25B is controlled to stagger the position of slits 27 in the two discs so that each slit 27 of disc 25A is centered between two slits 27 of disc 25B. Slits 27 permit discs 25A and 25B to open from the center as the impeller housing of pump 21 is installed in the filter assembly 10. Once the impeller housing has passed through the opening 26, discs 25A and 25B assume their natural form and the circular openings 26 fit snugly about shaft housing 22 so that dust and dirt are effectively prevented from falling inside the filter assembly 10.

An effective and inexpensive filter assembly is thus provided for use with an evaporative cooler pump and for various similar applications, in accordance with the stated objects of the invention. Although but a few embodiments of the invention have been illustrated and described, it will be apparent to those skilled in the art that various changes and modifications may be made threin without departing from the spirit of the invention or from the scope of the appended claims.

What is claimed is:

1. A filter assembly for a pump comprising:
a cylindrical housing open at one end with the cylindrical side of said housing being formed of an open mesh material,
a filter pad mounted within said housing juxtapositioned to the inside periphery of said housing, and
cover means for the open end of said housing,
said cover means defining an opening extending through a resilient portion thereof which is distortable when an impeller blade and its shaft is forced therethrough, but which assumes a substantially closed relaxed position sequentially thereafter.

2. The filter assembly set forth in claim 1 wherein:
said filter pad is formed of retriculated foam plastic material.

3. The filter assembly set forth in claim 1 wherein:
said cover means comprises a pair of parallel juxtapositioned discs,
each disc having a slit extending along a diameter of the disc toward but short of its periphery.

4. The filter assembly set forth in claim 3 wherein:
said slit of one disc is arranged substantially perpendicular to said slit of the other disc.

5. The filter assembly set forth in claim 3 wherein:
each disc is provided with a plurality of slits.

6. The filter assembly set forth in claim 1 wherein:
said cover means comprises a pair of parallel juxtapositioned discs,
each disc being provided with an aperture extending around its axis, and
at least one slit formed along a diameter of each aperture from the periphery of said aperture toward the periphery of said discs.

* * * * *